United States Patent
Liu et al.

(10) Patent No.: US 6,234,592 B1
(45) Date of Patent: May 22, 2001

(54) MAIN BOARD SUPPORT PANEL

(75) Inventors: Yu-Tai Liu, Hsin-Chuang; Yun-Lung Chen, Chung-Ho; Alvin Liu, Pa-Li, all of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/344,157

(22) Filed: Jun. 24, 1999

(30) Foreign Application Priority Data

Sep. 22, 1998 (TW) ............................................. 87215729

(51) Int. Cl.⁷ .................................................. A47B 81/00
(52) U.S. Cl. ...................................... 312/223.2; 312/265.5
(58) Field of Search ............................ 312/223.1, 223.2, 312/263, 257.1, 265.5, 265.6, 293.3; 361/683, 684, 685, 724, 725, 726, 727

(56) References Cited

U.S. PATENT DOCUMENTS

| | | | |
|---|---|---|---|
| 4,909,579 | * 3/1990 | Liu ........................................ | 312/223.2 |
| 5,124,885 | * 6/1992 | Liu ........................................ | 312/263 X |
| 5,397,176 | * 3/1995 | Allen et al. ........................... | 312/223.2 |
| 5,491,611 | * 2/1996 | Stewart et al. ....................... | 312/223.2 X |
| 5,893,616 | * 4/1999 | MacDonald et al. ................. | 312/265.5 X |
| 5,944,398 | * 8/1999 | Wu ........................................ | 312/223.2 |
| 5,975,659 | * 11/1999 | Yang et al. ............................ | 312/265.5 X |
| 6,097,591 | * 8/2000 | Ircha .................................... | 312/223.2 X |

* cited by examiner

*Primary Examiner*—Peter M. Cuomo
*Assistant Examiner*—Hanh V. Tran
(74) *Attorney, Agent, or Firm*—Wei Te Chung

(57) ABSTRACT

A main board support panel retains a main computer board in a computer enclosure. The main board support panel has a plate for supporting the main board. The plate has a bottom edge and an opposite top edge. Two retaining tabs are formed on the bottom edge. Two offset tabs are formed on a bottom plate of the enclosure and gaps are defined between the offset tabs and the bottom plate of the enclosure for receiving the retaining tabs therein. Two retaining lugs are formed on the top edge of the plate. Each retaining lug has an inclined first edge and an opposite second edge with a recess defined therein. Each retaining lug is inserted between first and second bosses formed on the enclosure by moving the main board support panel in a first direction substantially normal to the panel. The inclined edge of the retaining lug slides along the first boss of the enclosure for guiding and moving the main board support panel with respect to the enclosure in a second direction substantially normal to the first direction whereby the recess engages with the second boss to secure the panel in the enclosure.

14 Claims, 8 Drawing Sheets

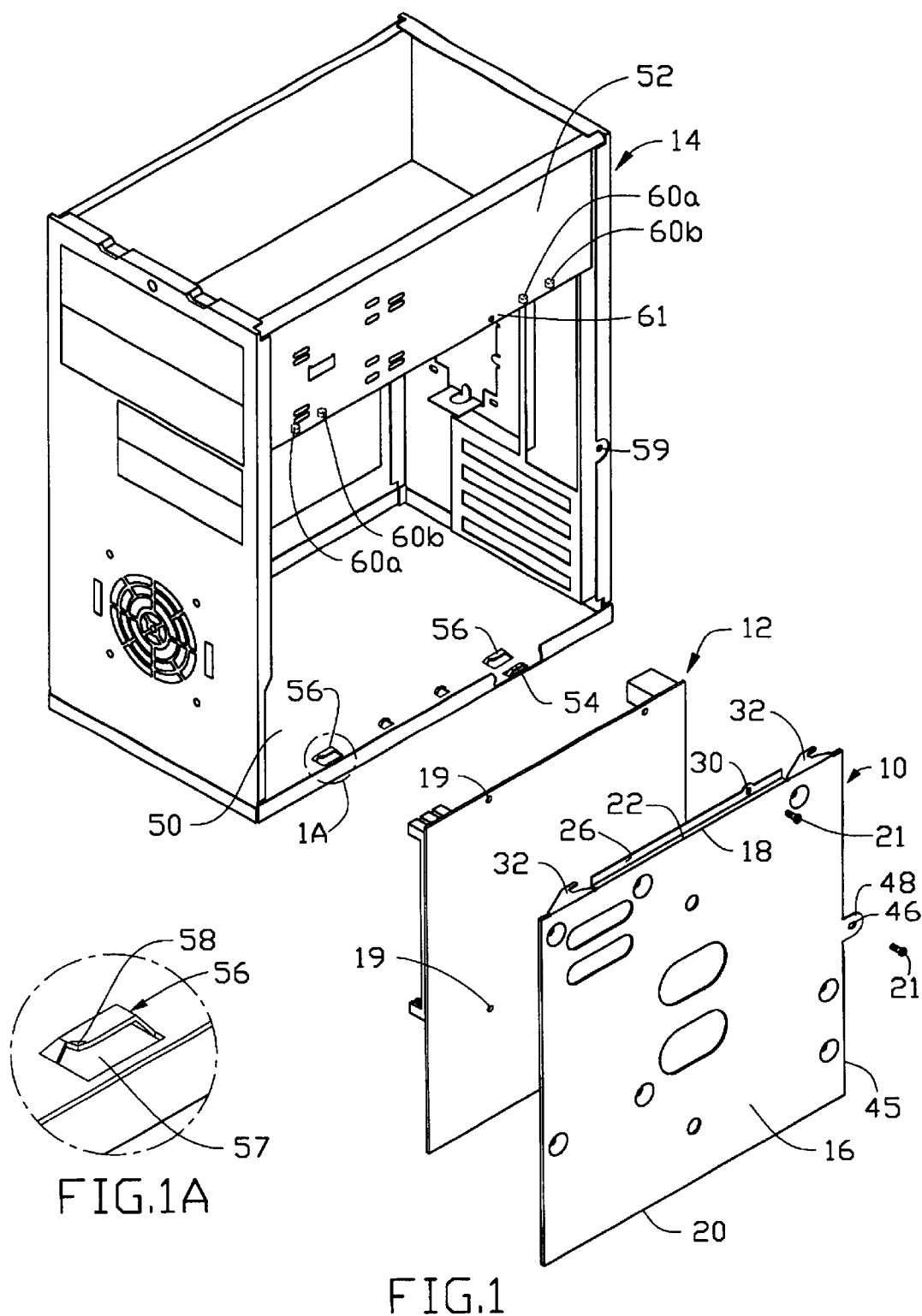

MAIN BOARD SUPPORT PANEL

BACKGROUND OF THE INVENTION

1. Field of the Invention

The present invention generally relates to a computer enclosure, and in particular to a support panel for retaining a main board inside a computer enclosure.

2. The Prior Art

A computer, such as a desktop computer, requires a main board for the operation thereof. A main computer board may be directly fixed in a computer enclosure. Alternatively, a support member may be provided for retaining the main computer board inside the enclosure. The support member may be a plate fixed in the enclosure or a movable or fixed carrier frame on which the main board is fixed. Another way to mount the main board in the enclosure is to provide slide rails under the main board. Examples of main board retaining devices are disclosed in Taiwan Patent Application Nos. 80202681, 81206906, 84214655 and 86209311 and U.S. Pat. Nos. 5,490,038, 5,724,231, and 5,737,184. Further information related to mounting a main board in a computer enclosure may be obtained from "NLX Motherboard Specification" Release 1.2 by Intel Corporation. However, conventional retaining devices have either a complicated structure or are assembled by a complicated process thereby increasing costs. It is thus desired to have a main board support panel having a simple structure that can be easily mounted to a computer enclosure.

SUMMARY OF THE INVENTION

Accordingly, an object of the present invention is to provide a main board support panel having a simple structure for mounting a main board in an enclosure.

Another object of the present invention is to provide a main board support panel that can be easily mounted in an enclosure.

A further object of the present invention is to provide a main board support panel that can be properly positioned inside an enclosure.

To achieve the above objects, in accordance with the present invention, a main board support panel retains a main computer board in a computer enclosure. The main board support panel comprises a plate for supporting the main board. The plate has a bottom edge and an opposite top edge. Two retaining tabs are formed on the bottom edge. Two offset tabs are formed on a bottom plate of the enclosure and gaps are defined between the offset tabs and the bottom plate of the enclosure for receiving the retaining tabs therein. Two retaining lugs are formed on the top edge of the plate. Each retaining lug has an inclined first edge and an opposite second edge with a recess defined therein, Each retaining lug is inserted between first and second bosses formed on the enclosure by moving the main board support panel in a first direction substantially normal to the panel. The inclined edge of the retaining lug slides along the first boss of the enclosure for guiding and moving the main board support panel with respect to the enclosure in a second direction substantially normal to the first direction whereby the recess engages with the second boss to secure the panel in the enclosure.

BRIEF DESCRIPTION OF THE DRAWINGS

The present invention will be apparent to those skilled in the art by reading the following description of a preferred embodiment thereof, with reference to the accompanying drawings, in which:

FIG. 1 is an exploded view of an enclosure showing a main board support panel in accordance with the present invention;

FIG. 1A is an enlarged view of encircled portion 1A of FIG. 1;

FIG. 3A is an enlarged view of encircled portion 3A of FIG. 3;

DETAILED DESCRIPTION OF THE PREFERRED EMBODIMENT

Figures 2, 2A:
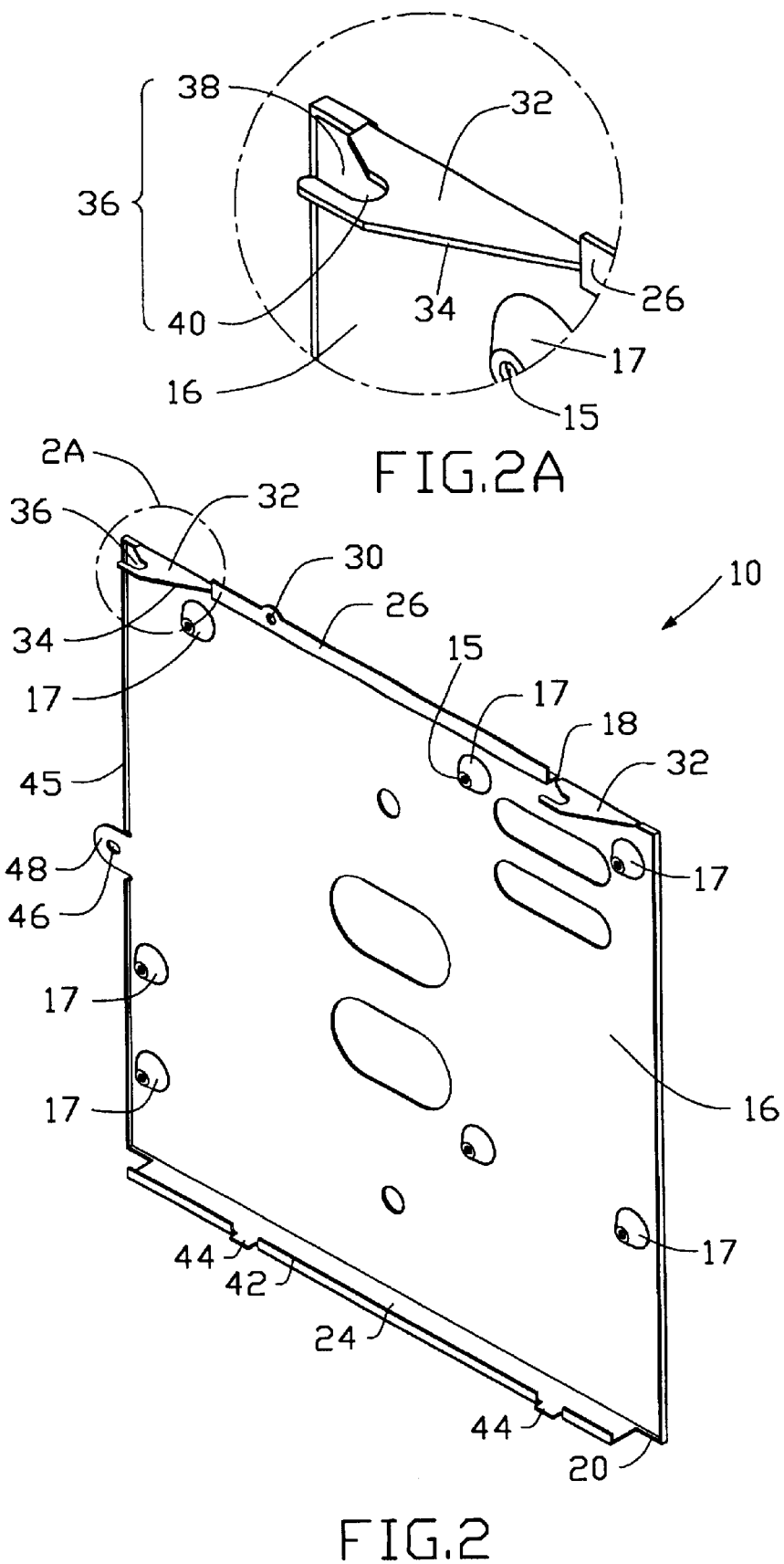
FIG. 2 is a perspective view of the main board support panel of the present invention.
FIG. 2A is an enlarged view of encircled portion 2A of FIG. 2.

Referring to the drawings and in particular to FIGS. 1 and 2, a main board support panel 10 constructed in accordance with the present invention is adapted to mount a main board 12 to an enclosure 14 of an electronic device, such as a personal computer. The main board support panel 10 comprises a plate 16 having upper and lower edges 18, 20 each having a perpendicularly extending side wall 22, 24. An extension 48 is formed on a lateral edge 45 (not labeled) of the plate 16 with a hole 46 defined therein.

A plurality of conical projections 17 are formed on an inside face of the plate 16 for supporting the main board 12 thereon. Each projection 17 defines a central bore 15 for insertion a bolt (not shown) therethrough for engaging with a corresponding hole 19 defined in the main board 12 thereby securing the main board 12 to the main board support panel 10.

The bottom side wall 24 has a bent flange 42 substantially parallel to the plate 16. A number of retaining tabs 44 is formed on the bottom side wall 24. The top side wall 22 has a bent flange 26 with a hole 30 defined therein.

Two retaining lugs 32 are formed on the top edge 18 of the plate 16 perpendicularly extending therefrom. Each lug 32 has an inclined first edge 34 and defines a recess 36 in an opposite second edge (not labeled) thereof. As shown in FIG. 2A, the recess 36 comprises a circular hole 40 and a diverging opening 38 communicating therewith.

Referring to FIGS. 1 and 1A, the enclosure 14 has a bottom plate 50 on which two aligned offset tabs 56 are formed. A gap 57 is defined between each offset tab 56 and the bottom plate 50. Each offset tab 56 has a flared edge 58. A plurality of aligned positioning projections 54 are formed on the bottom plate 50. A space is defined between the offset tabs 56 and the positioning projections 54 for slidably accommodating the bottom side wall 24 of the main board support panel 10. By moving the support panel 10 with respect to the enclosure 14, the retaining tabs 44 are received in the gaps 57 and engage with the offset tabs 56 (FIGS. 5 and 5A) for retaining the bottom edge 20 of the plate 16 on the bottom plate 50 of the enclosure 14. The inclined edge 58 of each offset tab 56 facilitates insertion of the retaining tab 44 into the corresponding gap 57.

Figure 5:
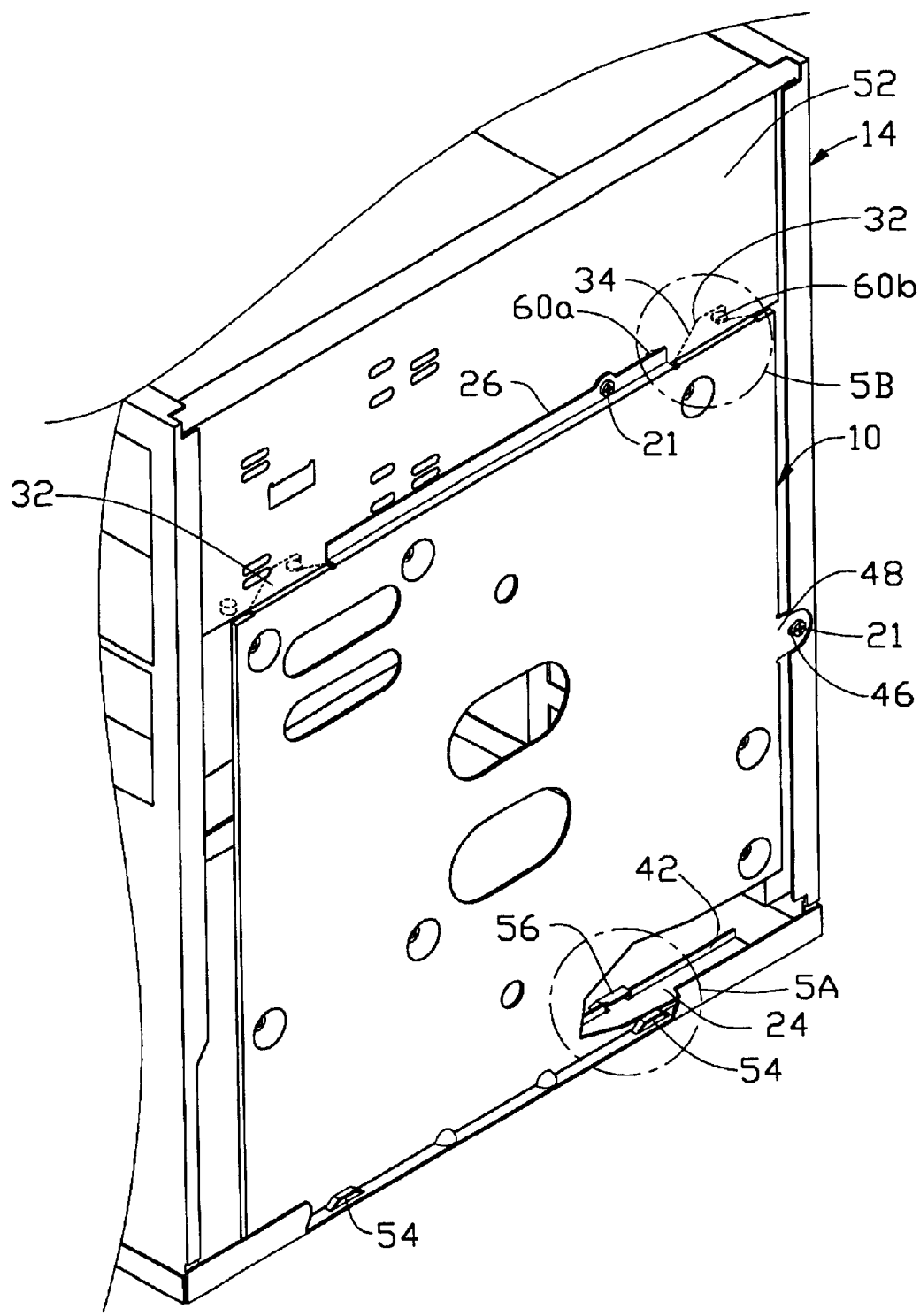
FIG. 5 is a partial perspective view showing a final stage of mounting the main board support panel to the enclosure.
Figure 5A:
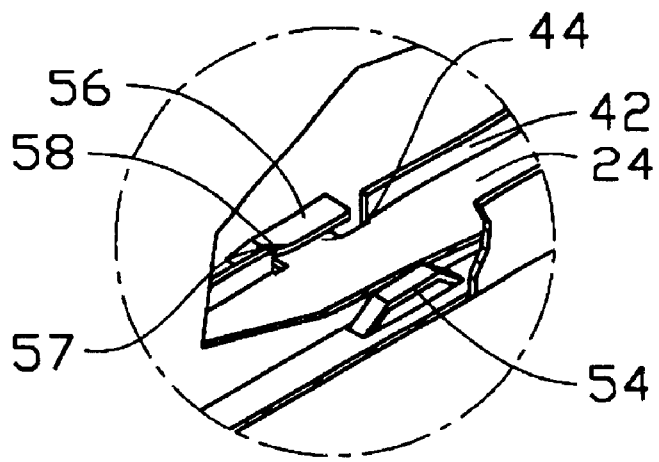
FIG. 5A is an enlarged view of encircled portion 5A of FIG. 5.
Figure 5B:
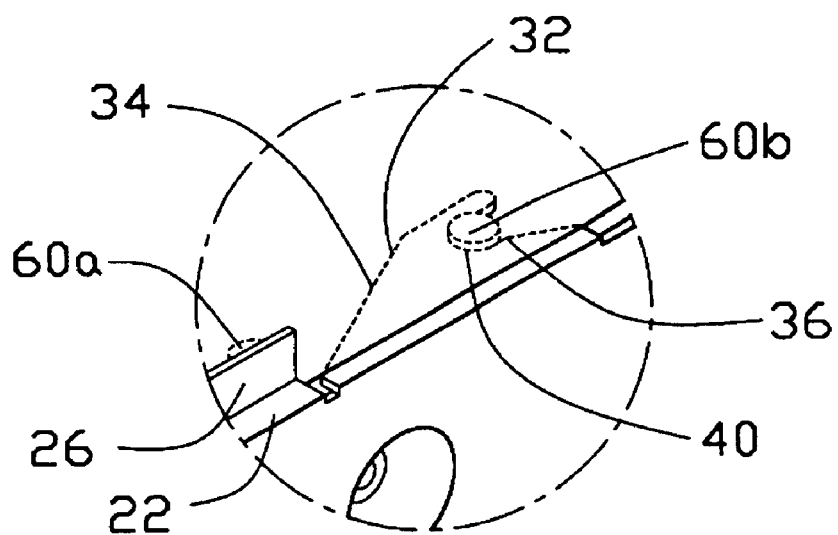
FIG. 5B is an enlarged view of encircled portion 5B of FIG. 5.

The enclosure 14 has a top bracket 52 with a bottom face on which two pairs of first and second cylindrical bosses 60a, 60b extend downwards corresponding to the retaining lugs 32 of the support panel 10. The first and second bosses 60a, 60b are spaced from each other for receiving the corresponding retaining lug 32 therebetween. The inclined edge 34 of each retaining lug 32 slides along the corresponding first boss 60a and drives the retaining lug 32 toward the second boss 60b whereby the second boss 60b is received in the recess 36 of the retaining lug 32. The diverging opening 38 of the recess 36 facilitates insertion of the second boss 60b into the circular hole 40 of the recess 36 as shown in FIG. 5B.

Figure 3:
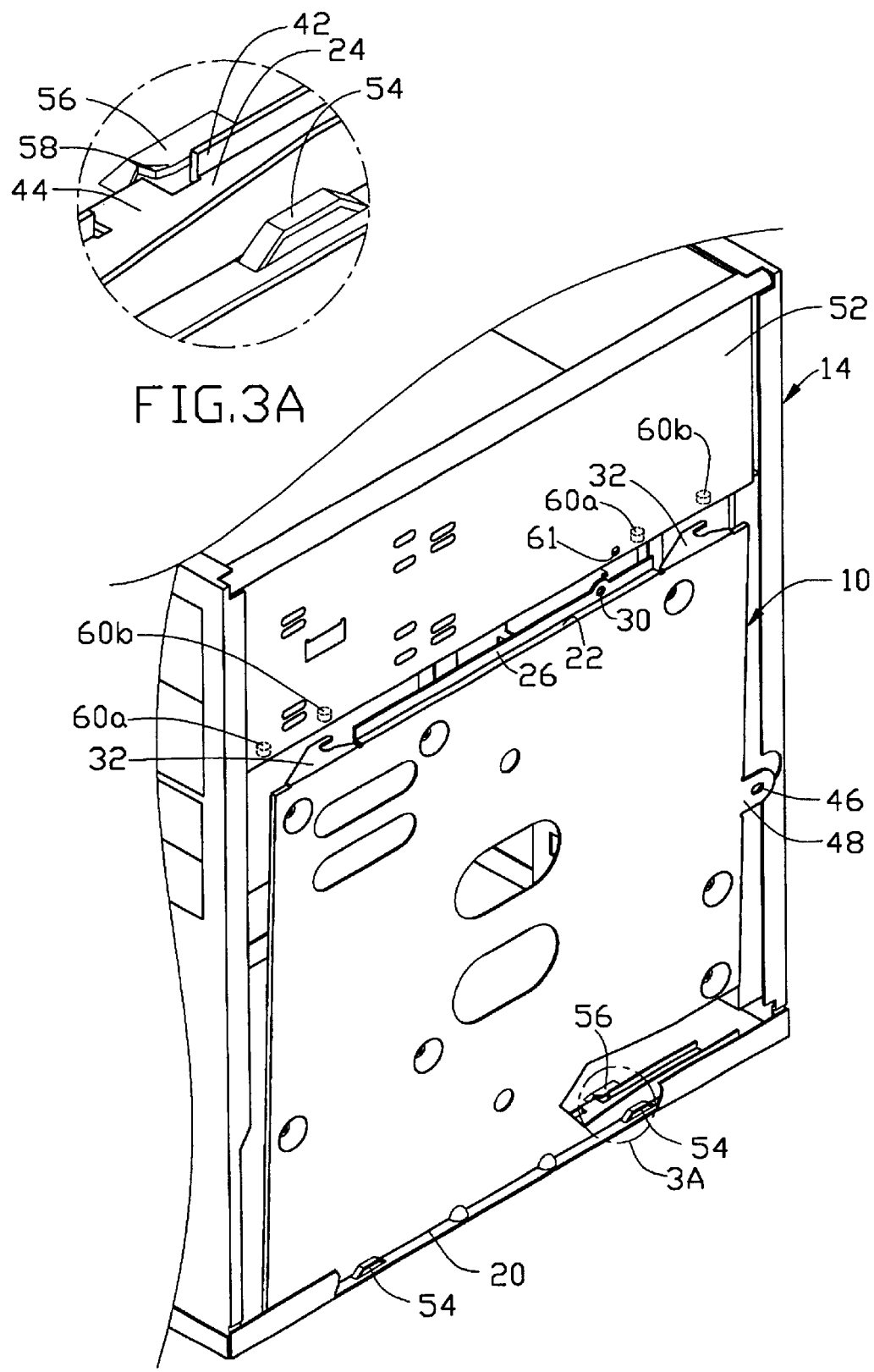
FIG. 3 is a partial perspective view showing the main board support panel initially attached to the enclosure.
Figure 4:
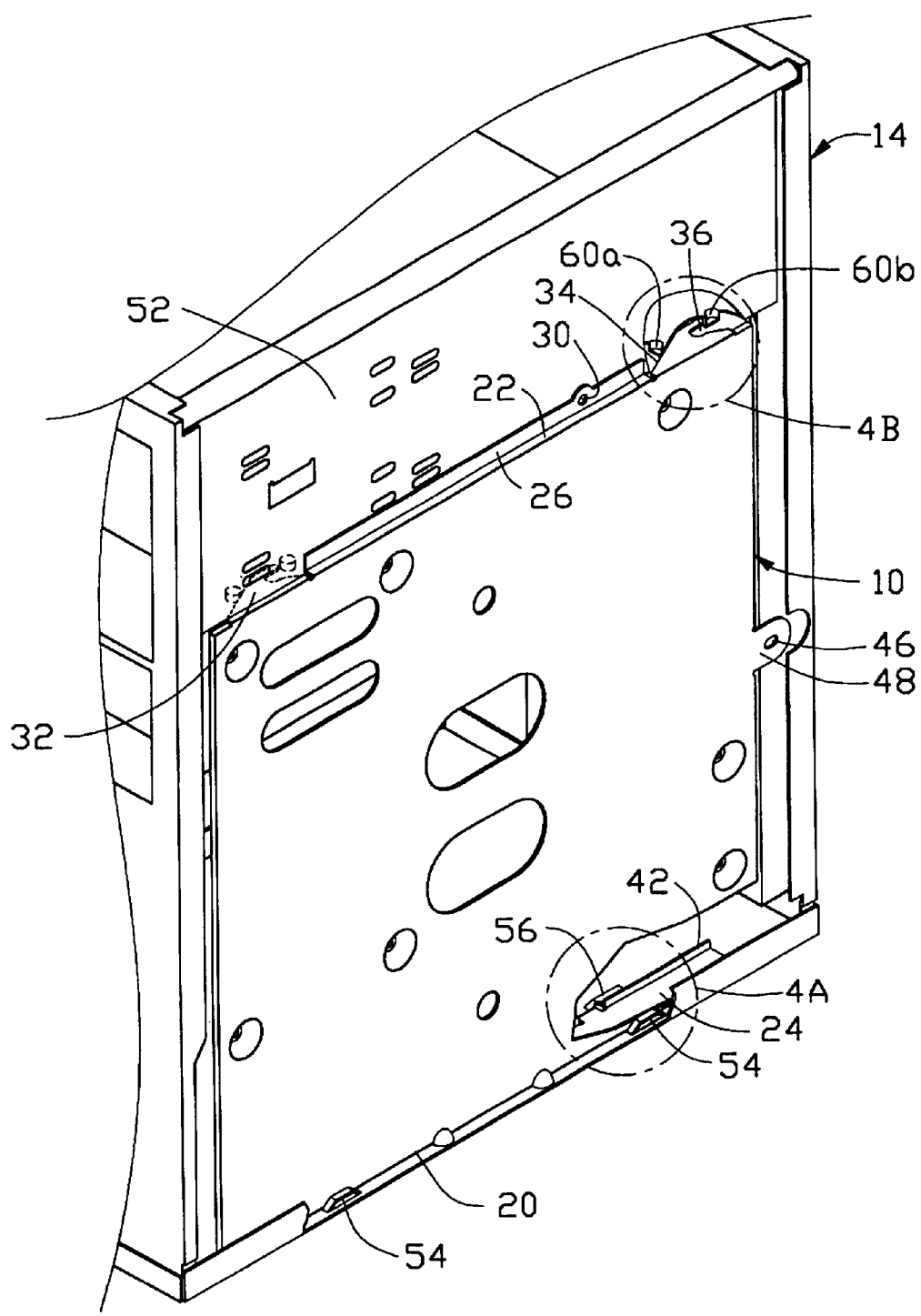
FIG. 4 is a partial perspective view showing an intermediate stage of mouting the main board support panel to the enclosure.
Figure 4A:
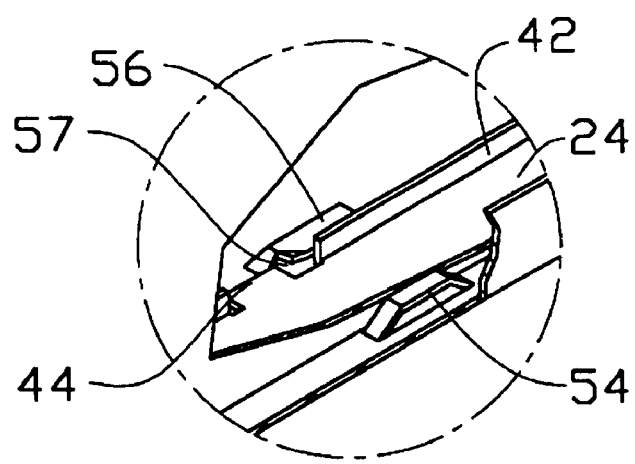
FIG. 4A is an enlarged view of encircled portion 4A of FIG. 4.
Figure 4B:
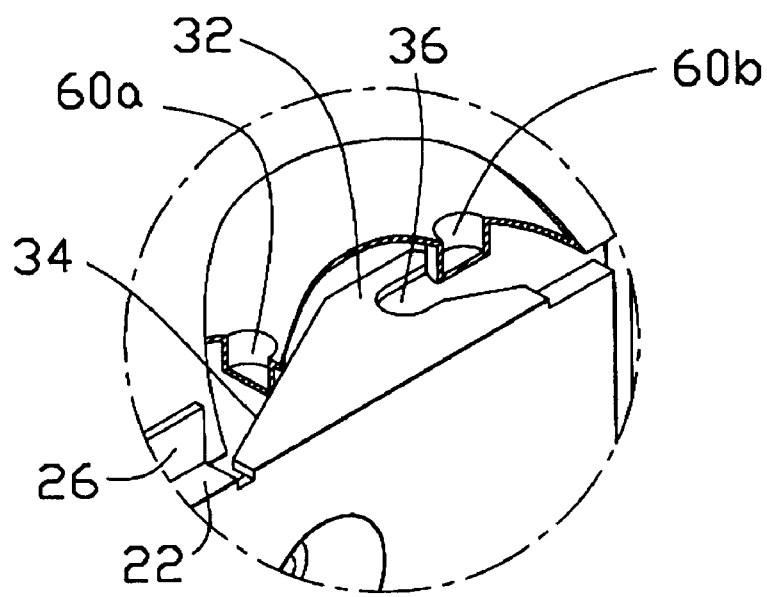
FIG. 4B is an enlarged view of encircled portion 4B of FIG. 4.

When mounting the main board support panel 10 to the enclosure 14, the bottom side wall 24 of the main board support panel 10 is initially inserted between the retaining tabs 56 and the positioning projections 54 with the plate 16 inclined with respect to the enclosure 14 as show in FIGS. 3 and 3A. The top side wall 22 is moved in a direction substantially normal thereto toward the top bracket 52 of the enclosure 14 whereby the bent flange 26 abuts against the top bracket 52 and the retaining lugs 32 are inserted between the corresponding bosses 60a, 60b as shown in FIGS. 4, 4A and 4B. The inclined edges 34 of the retaining lugs 32 slide along the first bosses 60a to move the main board support panel 10 in a direction substantially parallel to the plate 16 whereby the second bosses 60b are received in the circular holes 40 of the recesses 36 and the retaining tabs 44 of the bottom side wall 24 of the main board support panel 10 engage with the offset tabs 56 as shown in FIGS. 5, 5A and 5B.

Figure 6:
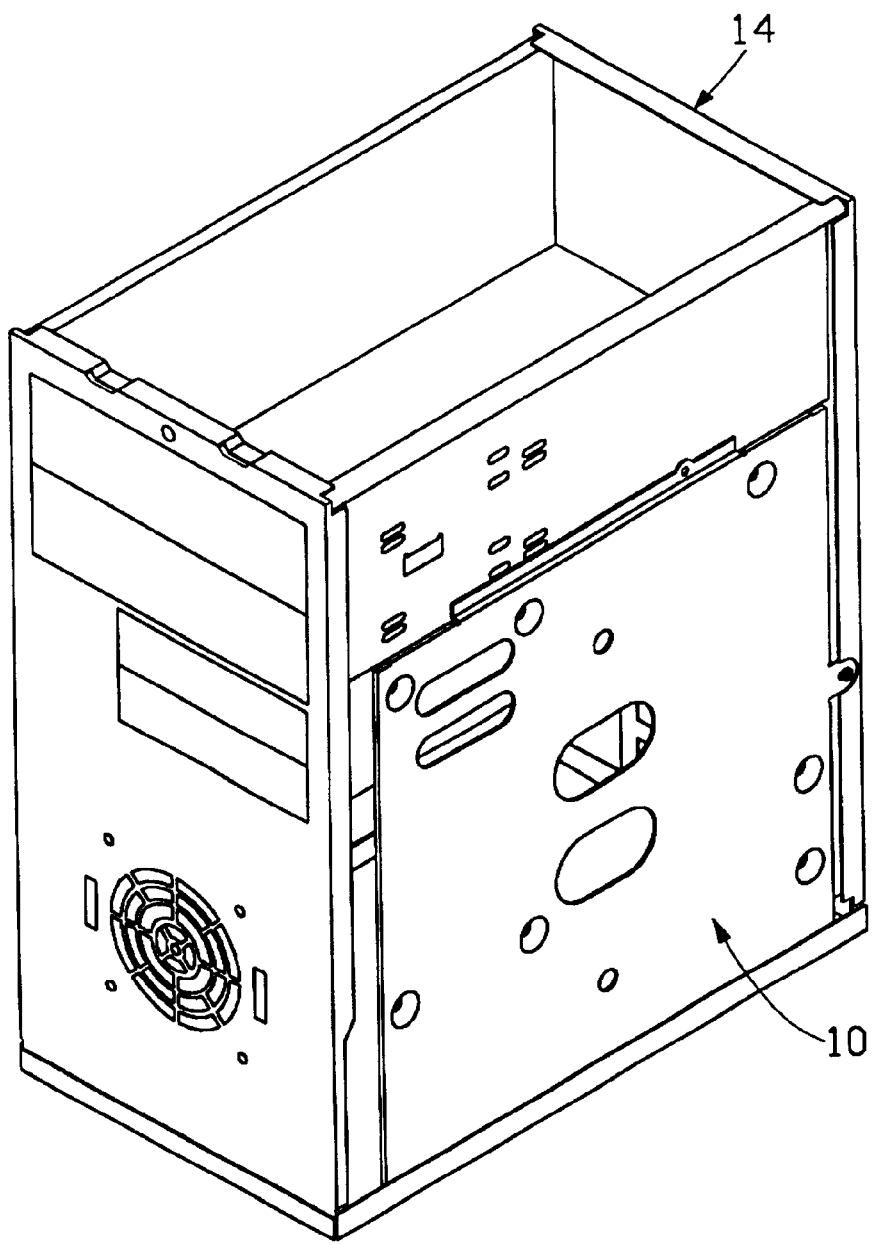
FIG. 6 is an assembled view of FIG. 1.

Bolts 21 are inserted through the holes 46, 30 of the main board support panel 10 and engage with corresponding screw holes 59, 61 defined in the enclosure 14 for securing the main board support panel 10 to the enclosure 14 as shown in FIG. 6.

Although the present invention has been described with reference to the preferred embodiment, it is apparent to those skilled in the art that a variety of modifications and changes may be made without departing from the scope of the present invention which is intended to be defined by the appended claims.

What is claimed is:

1. A main board support panel adapted to retain a main board in an enclosure, comprising:
    a plate adapted to support the main board, the plate having a first edge and an opposite second edge;
    at least one retaining tab being formed perpendicular to a general plane defined by the plate on the first edge and being adapted to be received in a corresponding gap defined in a bottom plate of the enclosure; and
    at least one planar retaining lug formed on the second edge perpendicular to the general plane of the plate, the retaining lug having an inclined first edge and an opposite second edge, a recess being defined in the second edge, the retaining lug being adapted to be received between first and second bosses formed on the enclosures the inclined first edge being capable of sliding along the first boss of the enclosure for guiding and moving the main board support panel with respect to the enclosure and for engaging the recess with the second boss.

2. The main board support panel as claimed in claim 1, wherein a side wall is formed on the second edge for abutting against the enclosure thereby properly positioning the main board support panel with respect to the enclosure.

3. The main board support panel as claimed in claim 1, wherein a side wall containing the at least one retaining tab is formed on the first edge of the plate for being received between the gap and at least one positioning projection formed on the bottom plate of the enclosure for properly positioning the main board support panel.

4. The main board support panel as claimed in claim 1, wherein an extension is formed on a lateral edge of the plate with a hole defined therein for insertion of a bolt therethrough to engage with a screw hole defined in the enclosure.

5. The main board support panel as claimed in claim 1, wherein a plurality of projections is formed on the plate for supporting the main board, a bore being defined in at least one of the projections for extension of a bolt therethrough to secure the main board to the main board support panel.

6. An interconnection system, comprising a panel adapted to retain a main board thereon, at least first and second bosses formed on the enclosure and a retaining lug being formed perpendicular to a general plane defined by the panel, the panel being movable in a first direction about a lower edge thereof toward the enclosure to insert the retaining lug between the bosses, the lug having a first inclined edge and an opposite second edge in which a recess is defined, the inclined edge of the retaining lug being capable of sliding along the first boss for driving the panel to move in a second direction substantially normal to the first direction to receive the second boss in the recess for securing the panel to the enclosure.

7. The interconnection system as claimed in claim 6, wherein the recess comprises a circular hole for accommodating the second boss and a diverging opening for facilitating insertion of the second boss into the circular hole.

8. The interconnection system as claimed in claim 6, wherein the panel comprises a face abutting against a surface of the enclosure for properly positioning the panel with respect to the enclosure.

9. The interconnection system as claimed in claim 8, wherein a hole is defined in the face of the panel for extension of a bolt therethrough to engage with a screw hole defined in the surface of the enclosure.

10. An interconnection system, comprising a panel adapted to retain a main computer board thereon, at least one offset tab and at least one projection formed on a bottom plate of the computer enclosure, an extension being formed at one edge of the panel, a rail being defined between the offset tab and the at least one projection for guiding and moving the extension of the panel along the bottom plate, a gap being defined between the offset tab and the bottom plate for engaging with the extension of the panel, thereby securing the panel to the enclosure.

11. The interconnection system as claimed in claim 10, wherein the offset tab comprises an inclined edge for facilitating insertion of the extension of the panel into the gap.

12. The interconnection system as claimed in claim 10, wherein a perpendicular side wall is formed on an edge of the panel, the extension being formed on the side wall, the side wall being slidably received between the offset tab and the at least one projection on the bottom plate of the enclosure for guiding the movement of the panel with respect to the enclosure.

13. A main board support panel adapted to retain a main board in an enclosure, comprising:

a plate adapted to support the main board, the plate having a first edge and an opposite second edge;

at least one retaining tab formed on the first edge and adapted to be received in a corresponding gap defined in a bottom plate of the enclosure;

at least one retaining lug formed on the second edge, the retaining lug having an inclined first edge and an opposite second edge, a recess being defined in the second edge, the retaining lug being adapted to be received between first and second bosses formed on the enclosure whereby the inclined edge thereof slides along the first boss of the enclosure for guiding and moving the main board support panel with respect to the enclosure and engaging the recess with the second boss; and a side wall formed on the second edge for abutting against the enclosure thereby properly positioning the main board support panel with respect to the enclosure, a hole being defined in a bent flange of the side wall for insertion of a bolt to engage with a screw hole defined in the enclosure.

14. A main board support panel adapted to retain a main board in an enclosure, comprising:

a plate adapted to support the main board, the plate having a first edge and an opposite second edge, a plurality of conical projections being formed on the plate for supporting the main board, a bore being defined in at least one of the projections for extension of a bolt therethrough to secure the main board to the main board support panel;

at least one retaining tab formed on the first edge and adapted to be received in a corresponding gap defined in a bottom plate of the enclosure; and at least one retaining lug formed on the second edge, the retaining lug having an inclined first edge and an opposite second edge, a recess being defined in the second edge, the retaining lug being adapted to be received between first and second bosses formed on the enclosure whereby the inclined edge thereof slides along the first boss of the enclosure for guiding and moving the main board support panel with respect to the enclosure and engaging the recess with the second boss.

\* \* \* \* \*